United States Patent [19]
Kobayashi et al.

[11] Patent Number: 4,723,350
[45] Date of Patent: Feb. 9, 1988

[54] METHOD OF PRODUCING OIL SEAL

[75] Inventors: Nobuyuki Kobayashi; Torami Hoshi, both of Fukushima, Japan

[73] Assignee: NOK Corporation, Fujisawa, Japan

[21] Appl. No.: 885,653

[22] Filed: Jul. 15, 1986

[30] Foreign Application Priority Data

Feb. 15, 1986 [JP] Japan ................. 61-229913

[51] Int. Cl.⁴ ............. B23P 17/00; B29C 59/02; B29D 1/00
[52] U.S. Cl. ......................... 29/417; 29/511; 29/520; 264/159; 264/292; 264/293; 264/318; 277/134; 277/152; 425/DIG. 47
[58] Field of Search ............... 264/138, 163, 266, 268, 264/159, 293, 296, 318, 310, 292, 339, 320; 425/DIG. 47; 29/527.1, 469.5, 557, 417, 511, 520; 277/1, 134, 152, 153

[56] References Cited
U.S. PATENT DOCUMENTS

| 2,990,206 | 6/1961 | Bagdon | 425/DIG. 47 |
| 3,276,114 | 10/1966 | Blaurock | 264/268 |
| 3,280,238 | 10/1966 | Calvert | 264/163 |
| 3,490,139 | 1/1970 | McKinven, Jr. | 29/527.1 |
| 3,613,223 | 10/1971 | Bush | 29/527.1 |
| 3,857,156 | 12/1974 | Clark | 29/417 |
| 3,929,341 | 12/1975 | Clark | 29/417 |
| 3,985,487 | 10/1976 | Clark | 425/DIG. 47 |
| 4,464,322 | 8/1984 | Butler | 264/138 |

FOREIGN PATENT DOCUMENTS 6956618 12/1985 Japan .

Primary Examiner—James Lowe
Attorney, Agent, or Firm—Holman & Stern

[57] ABSTRACT

A method of producing an oil seal comprises the following steps: a slicing step in which a seal ring is sliced from an end of a tubular billet of a resin material in a predetermined axial thickness; a fixing step in which the radially outer portion of the seal ring is fixed in the support member; and a bending-out/thread-forming step in which the radially inner portion of the seal ring is bent out of the plane of the radially outer portion of the seal ring thereby forming a tubular seal lip, and sequentially after forming of this seal lip, a screw thread is formed on the inner peripheral surface of the tubular seal lip. The fixing step is conducted by a press having an upper die and a lower die, in which the seal ring is fixed in the support member. The bending-out/thread-forming step is conducted by the press in which the radially inner portion of the seal ring is deformed into the tubular seal lip, and a screw thread is formed on the inner peripheral surface of the tubular seal lip by means of a mandrel having a tap. The bending-out/thread-forming step may be conducted in advance of the fixing step.

18 Claims, 14 Drawing Figures

METHOD OF PRODUCING OIL SEAL

BACKGROUND OF THE INVENTION

1. Field of the Invention

The present invention relates to a method of producing an oil seal which provides an oil-tight seal between two mechanical parts which are assembled coaxially and rotatively relatively to each other. More particularly, the invention is concerned with a method of producing an oil seal of the type described, having a screw thread groove formed in the sealing surface thereof.

2. Description of the Prior Art

FIGS. 12 to 14 illustrate a known oil seal of the type mentioned above and a known method for producing such an oil seal, which are disclosed in Japanese Patent Publication No. 60 56618/1985, and corresponding U.S. Pat. Nos. 3,857,156 and 3,929,341. Referring first to FIG. 12, an oil seal as a unit, designated generally by a reference numeral 100, has a plastic seal ring 101 the radially outer portion of which is fixed in an annular support member 102, while the radially inner portion of the seal ring 101 is bent towards the cavity in which the fluid to be sealed exists, thus forming a seal lip 103. The seal lip 103 thus formed is provided with a screw thread 104a formed on the sealing surface thereof. This oil seal 100 is produced in accordance with the following procedure. As the first step, a tubular billet 105, having predetermined inside and outside diameters, is made from a suitable resin material such as PTFE (reinforced plastic) and, after a screw thread is formed on an end surface from the inner peripheral portion of the tubular billet 105 by a screw thread forming means 104, a piece of seal ring of a desired thickness 101 is sliced and severed from the tubular billet 105 by a suitable slicing means 106, as shown in FIG. 13. Then, the seal ring 101 is deformed by a press such that its radially inner portion is bent in a desired angle out of the plane of the radially outer portion over its entire circumference, thus forming the seal lip 103, as shown in FIG. 14. More specifically, the press used in the bending work has a lower die 107 provided with a tapered surface 170a for forming the seal lip and a cooperative upper die 108. In operation, the lower and upper dies 107, 108 are brought together in the vertical direction as viewed in FIG. 14, so as to compress and bend the seal ring in the desired angle direction thereof. The seal ring is then fixed in the support member 102, thus completing the production of the oil seal.

This known production method encounters the following problems.

Firstly, it is to be pointed out that, since the bending of the seal ring 101 is effected after the formation of the screw thread 104a, the configuration and/or the depth of the screw thread 104a is varied due to elongation of the seal ring 101 caused by the bending work, making it difficult to keep the desired configuration and depth of the screw thread.

Secondly, since the sealing surface of the seal ring 101 is pressed against the tapered surface 107a of the lower die 107 by the compressive force during the bending work, the ridges of the screw thread 104a tend to be ground and collapsed so that the screw pump function fails, thus impairing the sealing performance of the oil seal.

Furthermore, the production efficiency is not very high and the production system as a whole is rendered too large in size, due to the fact that the formation of the screw thread work and the bending work are conducted in separate steps. In addition, since the radial width of the region in which the screw thread 104a is to be formed is determined by the radial movement of the screw thread forming means 104, it is necessary to further provide a control mechanism for controlling the radial movement of the screw thread forming means 104, resulting in a complicated construction of the screw thread forming means 104 as a whole.

SUMMARY OF THE INVENTION

Accordingly, an object of the present invention is to provide a method of producing an oil seal in which the formation of the screw thread work and the bending work of the seal ring are conducted in a single step thereby enabling the formation of the screw thread in desired configuration and depth, thus avoiding any collapse of the screw thread, while allowing an easy setting of the width of the region where the screw thread is formed.

To this end, according to one form of the present invention, there is provided a method of producing an oil seal comprising: a slicing step in which a seal ring is sliced from an end face of a tubular billet of a resin material in a predetermined axial thickness; a fixing step in which the radially outer portion of the seal ring is fixed in a support member; and a bending-out/thread-forming step in which the radially inner portion of the seal ring is bent out of the plane of the radially outer portion of the seal ring thereby forming a tubular seal lip, and sequentially after forming of this seal lip, a screw thread is formed on the inner peripheral surface of the tubular seal lip.

According to another form of the present invention, there is provided a method of producing an oil seal comprising: a slicing step in which a seal ring is sliced from an end face of a tubular billet of a resin material in a predetermined axial thickness; a bending-out/thread-forming step in which the radially inner portion of the seal ring is bent out of the plane of the radially outer portion of the seal ring thereby forming a tubular seal lip, and sequentially after forming of this seal lip, a screw thread is formed on the inner peripheral surface of the tubular seal lip; and a fixing step in which the radially outer portion of the seal ring is fixed in a support member.

These and other objects, features and advantages of the present invention will become clear from the following description of the preferred embodiments when the same is read in conjunction with the accompanying drawings.

BRIEF DESCRIPTION OF THE DRAWINGS

FIGS. 2 to 9 are illustrations of a first embodiment of the method for producing the oil seal in accordance with one form of the present invention wherein:

FIG. 2 is a schematic perspective view of a slicing step;

FIGS. 3 and 4 are schematic cross-sectional views illustrating a fixing step;

FIGS. 5 to 7 are schematic cross-sectional views illustrating a bending-out/thread-forming step;

FIG. 8 is a schematic perspective view of a mandrel;

FIG. 9 is a cross-sectional view taken along the line IX—IX of FIG. 8;

DETAILED DESCRIPTION OF THE PREFERRED EMBODIMENTS

Figure 1:
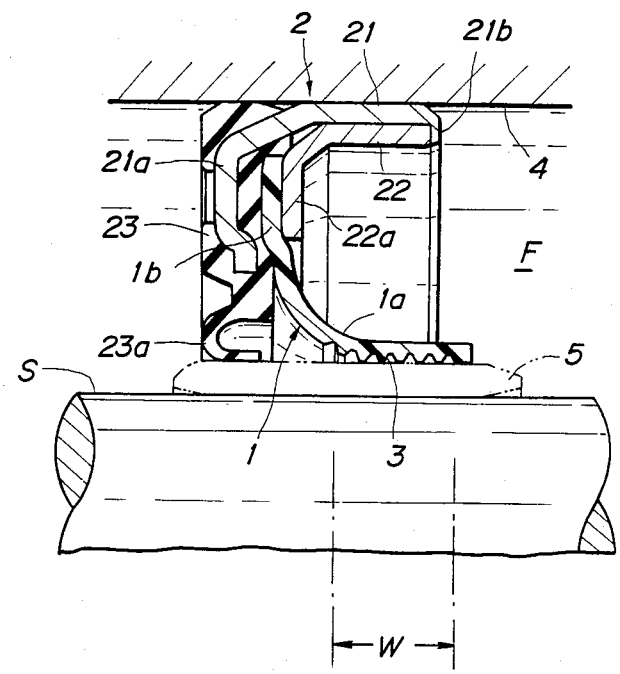
FIG. 1 is a partial cross-sectional view of an essential part of an oil seal to which the present invention pertains.

Preferred embodiments of the present invention will now be explained with reference to the accompanying drawings. FIG. 1 shows an oil seal which is produced by a method embodying the present invention. The oil seal has a seal ring 1 made of a resin material and the radially inner portion of this seal ring 1 is bent out such as to extend towards the cavity "F" where the fluid to be sealed exists, thus forming a seal lip 1a. The sealing surface of the seal lip 1a, which contacts a surface of a rotary shaft "S", has a screw thread 3 over a predetermined width "W" starting from the end extremity of the seal lip 1a. On the other hand, the radially outer portion of the seal ring 1 is fixed in an annular support member 2 which is composed of an outer cylinder 21 to be fixed in a housing 4 and an inner cylinder 22 received in the outer cylinder 21. The end of the outer cylinder 21 remote from the sealed fluid is bent radially inwardly so as to form a flange 21a. An outer ring 23 of a rubbery elastic member is heat-bonded to the flange 21a so as to provide a contact seal between the housing 4 and the rotary shaft "S". The radially outer end portion 1b of the seal ring 1 is clamped between the outer ring 23 on the flange 21a and a flange 22a which extends radially inwardly from the end of the inner cylinder 22 remote from the fluid cavity "F". The other end 21b of the outer cylinder 21 adjacent the fluid cavity "F" is curled over the corresponding end of the inner cylinder 22, whereby the seal ring 1 is fixed in the support member 2. A reference numeral 5 denotes a sleeve which is disposed as required between the seal lip 1a of the seal ring 1 and the rotary shaft "S". The sleeve 5 is effective in preventing wear of the surface of the rotary shaft S, so as to maintain a constant sealing pressure. A reference numeral 23a denotes a dust lip provided on the inner peripheral end portion of the outer ring 23. The dust lip 23a is turned back towards the fluid cavity "F" so as to make resilient contact with the surface of the rotary shaft "S".

FIGS. 2 to 7 show a first embodiment of the method for producing the oil seal explained hereinbefore in accordance with the one form of the present invention.

Figure 2:
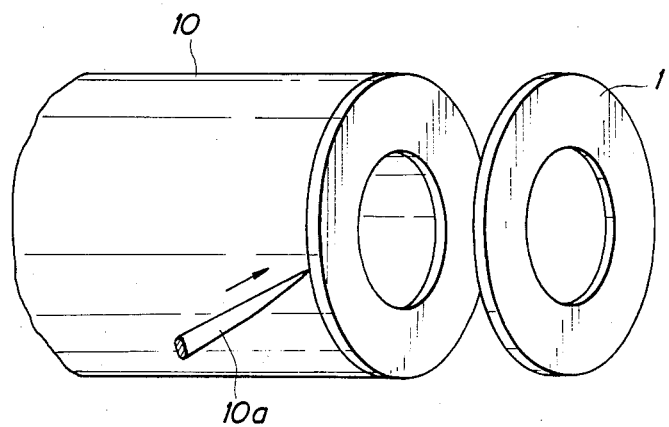

Referring to FIG. 2 in which the slicing step of the seal ring 1 is shown, a tubular billet 10 is formed from the resin material which is used as the material of the seal ring. The tubular billet 10 has a predetermined inside diameter and an outside diameter. As in the case of a conventional method, the tubular billet 10 is chucked by, for example, a chuck of a lathe, so that it can rotate about its own axis. A suitable tool such as a cutting tool 10a also is carried by the lathe so as to be able to move towards and away from the billet 10. As the lathe operates, therefore, washers of a seal ring 1 are successively sliced from the tubular billet 10.

In the illustrated embodiment, the resin material used as the material of the tubular billet 10 and, hence, the material of the seal ring 1 is PTFE resin (reinforced resin) which exhibits superior wear resistance, weather resistance, oil resistance, heat resistance and chemical resistance. The use of the PTFE resin, however, is not exclusive and the present invention does not exclude the use of other kinds of resin. Examples of such resins are FEP (tetrafluoroethylene-hexafluoropropylene copolymer), PFA (tetrafluoroethylene-perfluoroarcoxide), EPFE (ethylene-tetrafluoroethylene copolymer), polyetheretherketone, and polymeric polyethylene.

In order to improve the wear resistance while reducing the friction, these resin material may contain one or more of fillers such as short glass fibers, short carbon fibers, metal fibers, short ceramics fibers, whiskers, graphite powder, metal powder, glass powder, ceramics powder and resin powder.

Figure 3:
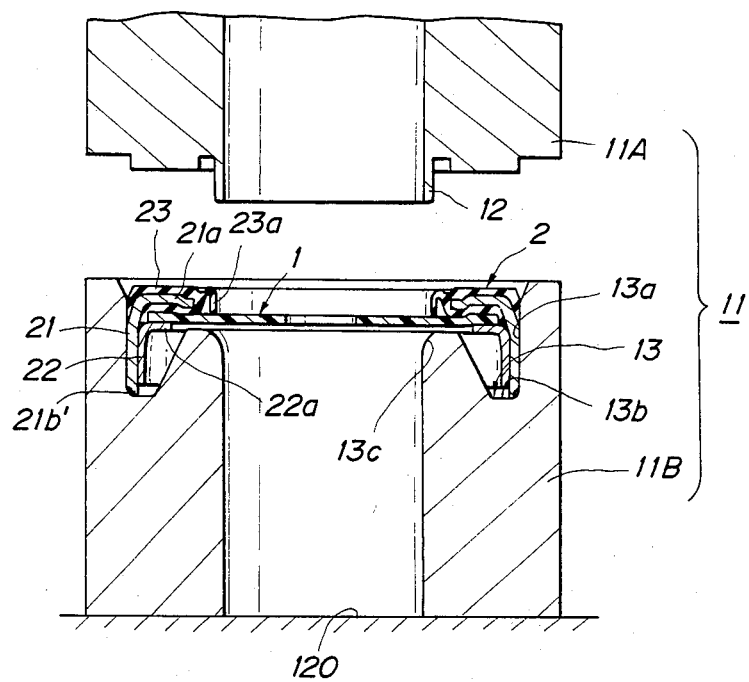
Figure 4:
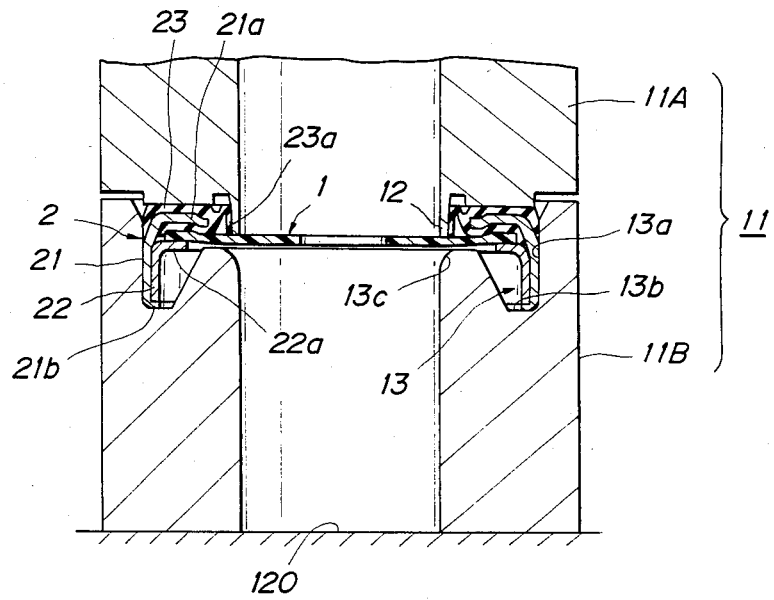

Then, the process proceeds either to a step for fixing the seal ring 1 in a support member 2 or to a bending-out/thread-forming step. According to the first form of the present invention, the fixing work of the seal ring 1 to the support member 2 is conducted before the bending-out/thread-forming step. The fixing work is conducted by press-curling as shown in FIGS. 3 and 4 or by roller curling (not shown). Referring to FIG. 3, a reference numeral 11 designates a hollow cylindrical press which is composed of an upper die 11A provided with an annular wall 12 and a lower die 11B provided with an annular recess 13. The lower die 11B is constituted by a cylindrical member fixed to the base 120, and the annular recess 13 formed on the upper side thereof receives the support member 2 of the oil seal. The annular recess 13 has an outer peripheral wall 13a which extends vertically, as shown, with respect to the surface of the base 120 so as to guide the outer cylinder 21 of the support member 2. The lower die 11B also has an annular rounded portion 13C formed on the upper end of the inner periphery thereof. Thus, the rounded portion 13C is formed partly on the inner periphery on the side of recess 13 opposite to the outer peripheral wall 13a. The fixing of the seal ring 1 to the support member 2 is conducted firstly by setting the seal ring 1 and the inner cylinder 22 inside the outer cylinder 21 in the mentioned order, placing these parts in the annular recess 13 of the lower die 11B such that the flanges 21a, 22a of the outer and inner cylinders 21, 22 are axially spaced with the seal ring 1 positioned horizontally therebetween, and closing the press 11 by moving the upper die 11A downwardly. In consequence, the annular projection 21b' on the end extremity of the outer cylinder 21 is inwardly bent along the bottom 13b of the annular recess 13, so that the end 21b of the outer cylinder 21 is curled onto the corresponding end of the inner cylinder 22, thus completing the fixing of the seal ring 1 to the support member 2. In this stage, the seal ring 1 is positioned and held horizontally, as shown in FIG. 4.

Figure 5:
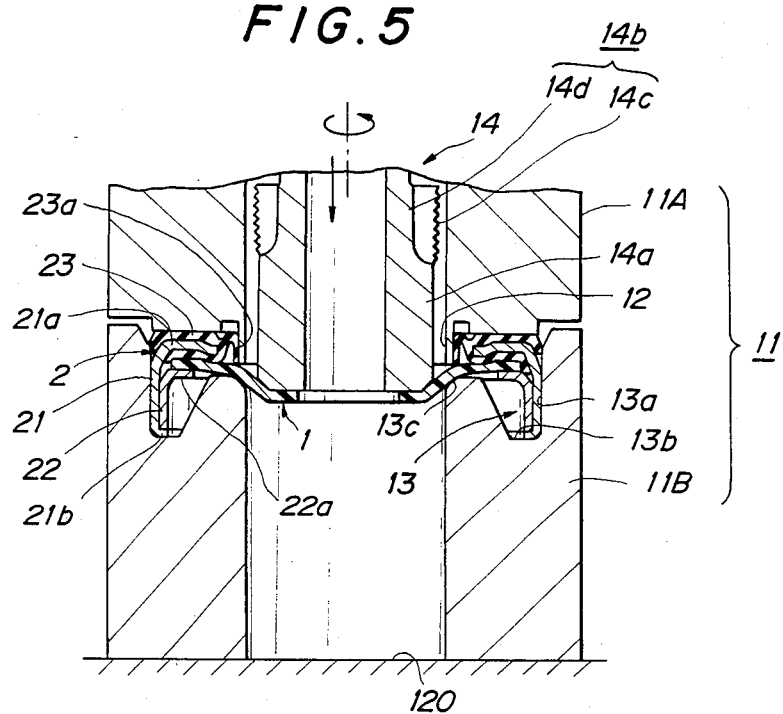
Figure 6:
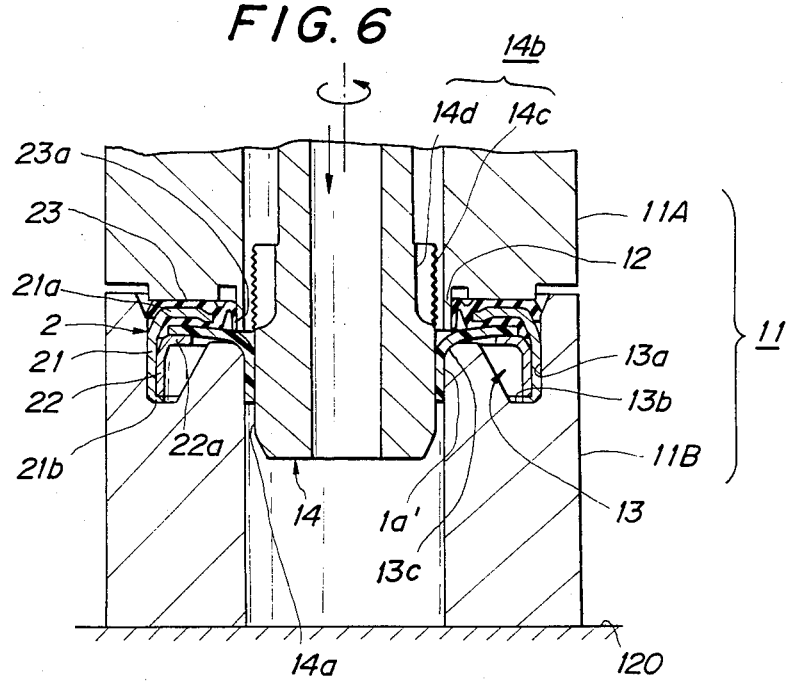
Figure 7:
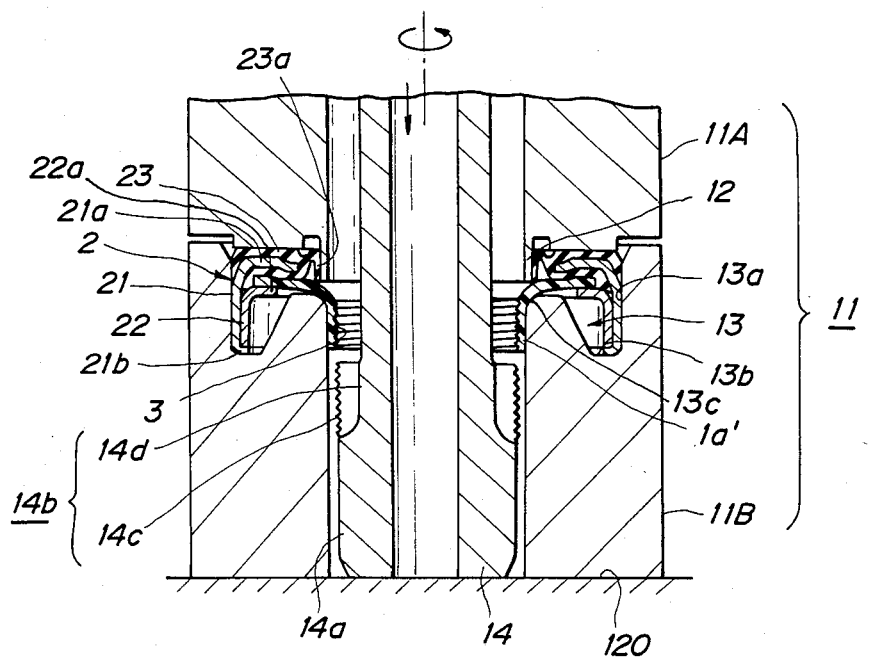
Figure 8:
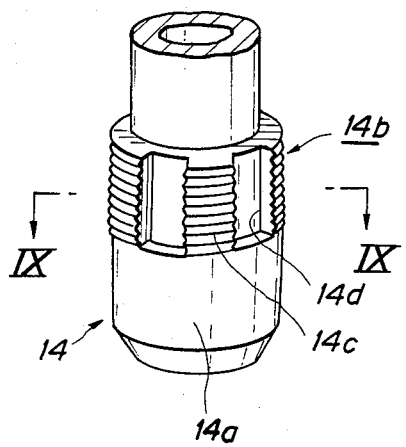
Figure 9:
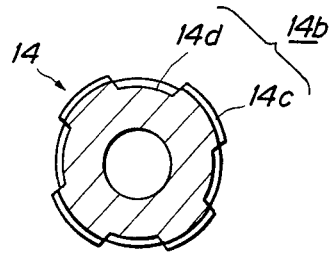

Then, the process proceeds to the bending-out/thread-forming step which is shown in FIGS. 5 to 7, in which the bending of the radially inner portion of the seal ring 1 out of the plane of the radially outer portion and the formation of the screw thread in the said bent portion are conducted sequentially. This step is conducted by making use of a mandrel 14 which may be hollow or solid. The mandrel 14 is placed in the bore of the press dies 11 coaxially therewith, in such a manner as to be movable reciprocatingly in the axial direction within the bore. The mandrel 14 has a lower large-diameter portion 14a, the outside diameter of which is greater than the inside diameter of the seal ring 1, but is smaller than the inside diameter of the lower die 11B by an amount substantially equal to the thickness of the seal ring 1. Therefore, an annular gap is formed between the outer peripheral surface of the large-diameter portion 14a and the inner peripheral surface of the lower die 11B. The most lower end of the large-diameter portion 14a is tapered downwardly so as to be able to progressively bend the inner peripheral edge portion of the seal ring 1. A tap 14b is formed on the mandrel 14 at a portion thereof which is spaced upwardly by a predetermined distance from the tapered end of the large-diameter portion 14a. The tap 14b is intended for forming a screw thread 3 on the sealing surface of the seal ring 1. As will be seen from FIGS. 8 and 9, the tap 14b has a plurality of axially-extending threading portions 14c which are provided with cutting threads and are equi-spaced in the circumferential direction by axially-extending recesses 14d which are adapted to allow the chips of the material to be discharged during the threading. In the illlustrated embodiment, the tap 14b has four threading portions 14c.

The bending-out/thread-forming step is conducted by driving the mandrel 14 downwardly while rotating the same about its own axis. As a result of the rotary and downward movement of the mandrel 14, the large-diameter portion 14a of the mandrel 14 progressively presses the radially inner portion of the seal ring 1, so that the radially inner portion of the seal ring 1 is bent out so as to extend downwardly over the rounded portion 13C, and is squeezed between the outer peripheral surface of the mandrel 14 and the inner peripheral surface of the lower die 11B, so as to be formed into a tubular seal lip 1a'. The annular wall 12 formed on the lower end of the inner peripheral portion of the upper die 11A effectively prevents any interference between the dust lip 23a and the mandrel 14 when the upper die 11A is brought into contact with the lower die 11B, thus avoiding breakage of the dust lip 23a. As the mandrel 14 is further moved down while being rotated, a screw thread 3 is formed on the inner peripheral portion of the seal lip 1a', by the action of the tap 14b on the mandrel 14. If the annular rounded portion 13C provided on the upper end of the inner peripheral portion of the lower die 11B has a large radius of curvature, the axial length of the inner peripheral surface of the seal lip 1a' contactable with the tap 14b is reduced so that the width "W" (see FIG. 1) of the region where the screw thread 3 is formed is decreased. Conversely, if the annular rounded portion 13C has a small radius of curvature, the width "W" of the region where the screw thread 3 is formed can be increased. Thus, the width "W" of the region where the screw thread 3 is formed can be varied by changing the radius of curvature of the rounded portion 13C, and the screw thread 3 can be formed over the desired width "W" simply by moving the mandrel 14 downwardly.

The driving of the mandrel 14 is continued until the lower end of the mandrel 14 is brought into contact with the surface of the base 120. Thereafter, the mandrel 14 is withdrawn from the dies 11A, 11B. This may be conducted by first moving the dies 11A, 11B upwardly away from the base 120 and then withdrawing the mandrel 14 downwardly from the dies 11A, 11B. Thus, the mandrel 14 is separated from the seal lip 1a' after the formation of the screw thread 3 in the seal lip 1a' by the tap 14B.

After the separation of the mandrel 14, the seal lip 1a' springs back due to its resiliency such that its inner peripheral edge contracts, so that frusto-conical seal lip 1a is formed as shown in FIGS. 1. Thus, the bending-out of the radially inner portion of the seal ring 1 and the formation of the screw thread in the bent seal lip 1a of the seal ring 1 can be completed in a single step.

Figure 10:
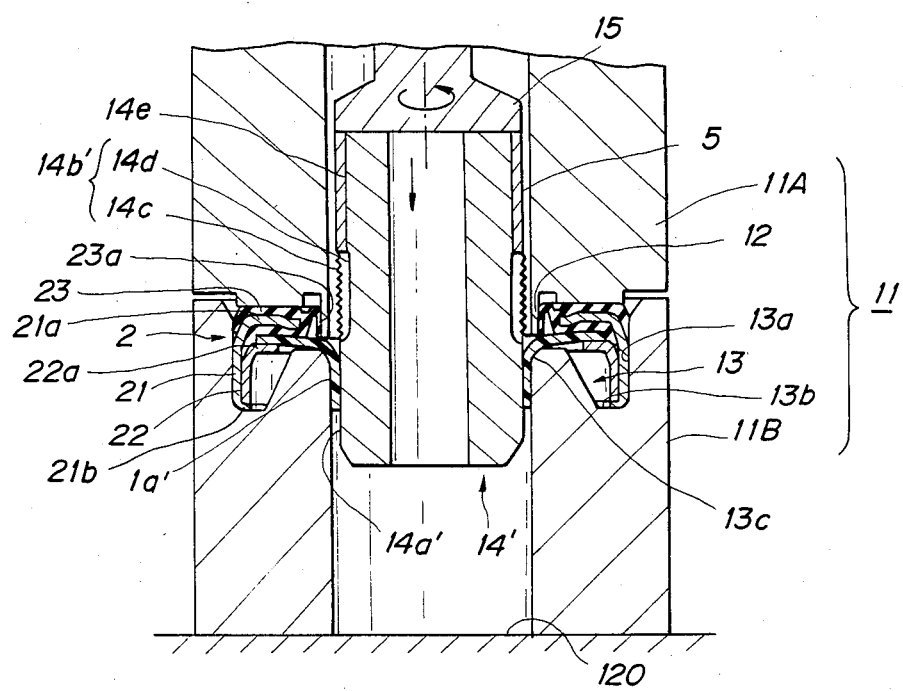
FIGS. 10 and 11 are cross-sectional views of another embodiment in accordance with the first form of the present invention, illustrating the operation for automatic assembly of a sleeve.
Figure 11:
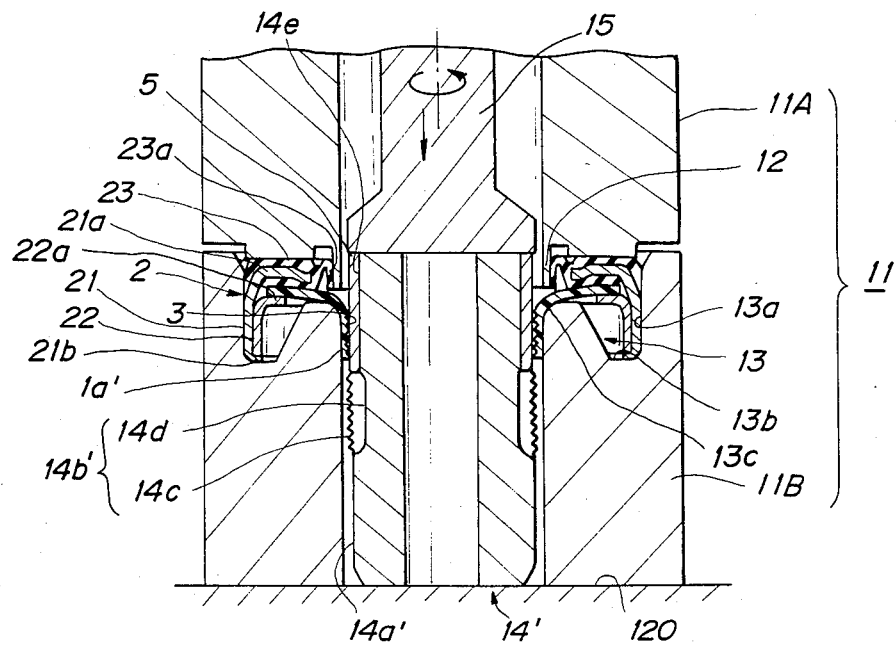
Figure 12:
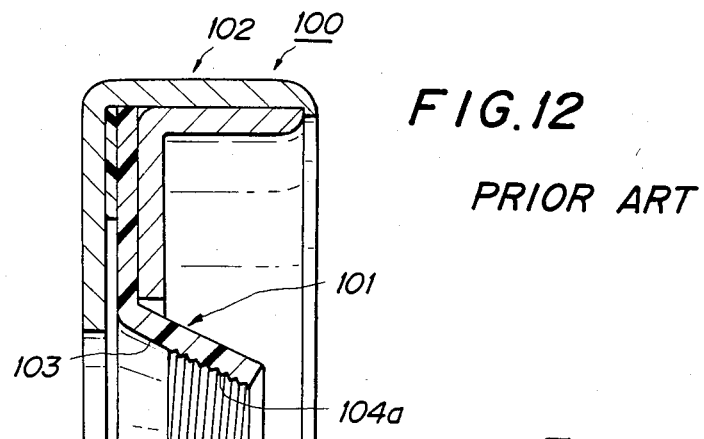
FIG. 12 is a partial cross-sectional view of an essential portion of a conventional oil seal.
Figure 13:
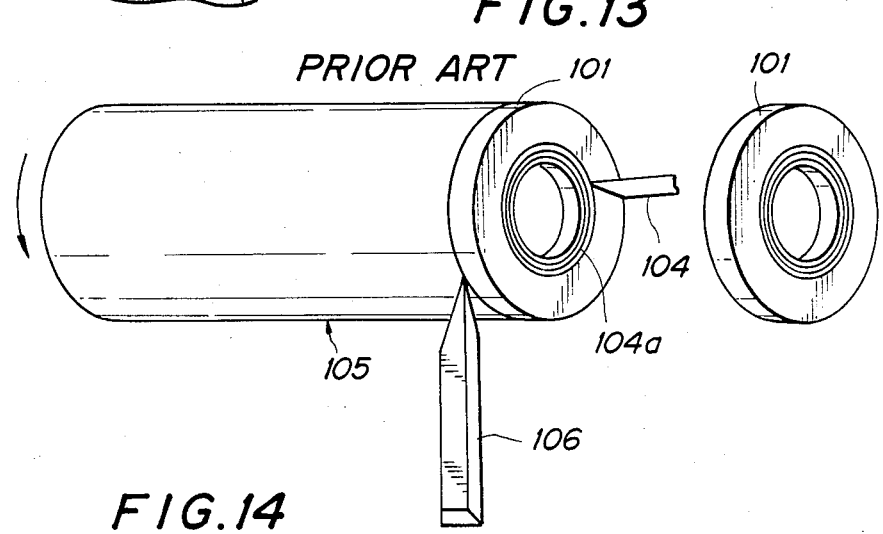
FIG. 13 is a perspective view of a slicing and screw-thread forming step of the seal ring in a known method for forming the conventional oil seal.
Figure 14:
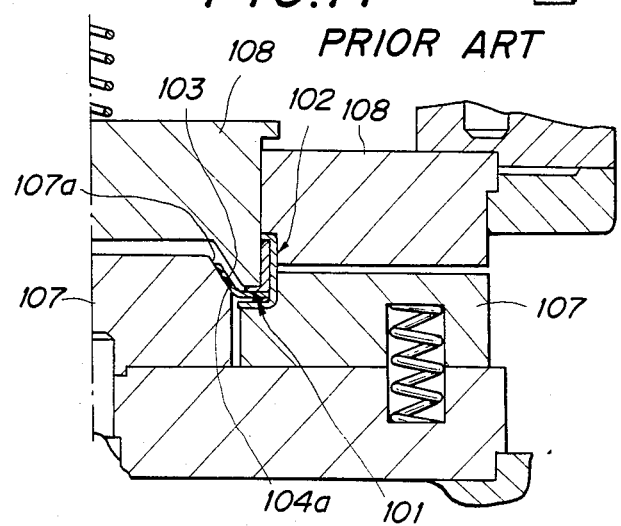
FIG. 14 is a partial cross-sectional view of an essential portion showing a step of the known method for bending and fixing the seal ring.

FIGS. 10 and 11 show another embodiment of the method for producing an oil seal in accordance with the first form of the present invention. In this embodiment, a sleeve 5 is fitted on the outer periphery of the mandrel 14' within the dies 11.

More specifically, in this embodiment, the mandrel 14' has a comparatively small axial length and is provided with the tap 14b' and a sleeve mounting portion 14e immediately on the trailing side of the tap 14b'. The sleeve 5 is beforehand fitted around the sleeve mounting portion 14e. Thereafter, a drive shaft 15 is detachably connected to the trailing end of the short mandrel 14', such that the mandrel 14' is driven downwardly and rotatingly by the drive shaft 15. When the end of the mandrel 14' reaches the surface of the base 120, the sleeve 5 is just positioned within the seal lip 1a' of the seal ring 1 as shown in FIG. 11, so that the sleeve 5 is securely held by the seal lip 1a' as the latter springs back due to its resiliency. Therefore, after disconnecting the mandrel 14' from the drive shaft 15, the oil seal can be withdrawn from the lower die 11B with keeping the sleeve 5 fitted therein.

First and second embodiments of the method in accordance with the first form of the present invention have been described heretofore with reference to FIGS. 3 to 7 and FIGS. 10 and 11, in which the seal ring 1 is fixed in the support member 2 in advance of the bending-out and formation of the screw thread. This, however, is not exclusive. Namely, according to a second form of the present invention, the fixing of the seal ring 1 to the support member 2 is conducted after the execution of the bending-out/thread-forming step, using a press which may be the same, or not the same, as that used in the first form of the present invention.

It is, however, to be noted that according to the preferable first form of the present invention, the bending-out/thread-forming step of the seal ring 1 can be executed while this seal ring is held in the support member 2, immediately after the fixing of the seal ring 1 in the support member, so that a higher production efficiency is achieved than in the second form of the present invention.

As will be understood from the foregoing description, the invention offers the following advantages.

First of all, it is to be noted that, according to the first form of the present invention, the final product of the oil seal can be obtained after the completion of the bending-out/thread-forming step, which is conducted following the slicing of the seal ring and fixing of the same in the support member. In addition, since the formation of the tubular seal lip and the formation of the screw thread in the inner peripheral surface of this seal lip are conducted continuously or successively, the application of tensile or compression force to the screw thread, which inevitably occurs in the conventional method, is advantageously avoided. Consequently, the change in the depth and/or configuration of the screw thread, as well as collapse of the same, which heretofore occurred during the bending work of the seal ring, are prevented, and the screw thread can be formed to have desired depth and configuration. This in turn ensures the expected screw pumping function and, hence, a superior sealing performance of the oil seal. In addition, in the method of the present invention, the bending out of the seal ring and the formation of the screw thread which heretofore have been conducted in separate steps are executed in a single step, so that the number of steps is decreased to afford a higher production efficiency. Furthermore, since the screw thread is formed on the inner peripheral surface of the seal lip which has been formed in a tubular form, it is possible to freely and linearly change the width of the region of the seal lip surface where the screw thread is formed.

Finally, in the method of the first form of the present invention, the bending-out/thread-forming step is conducted after the fixing of the seal ring on the support member so that the bending-out of the seal ring and the formation of the screw thread in the seal lip can be continuously or successively conducted by using the press which also holds the support member, so that the production efficiency is further improved advantageously.

Although the present invention has been described through specific terms, it is to be noted that the described embodiments are only illustrative and various changes and modifications are possible within the scope of the present invention which is limited solely by the appended claims.

We claim:

1. A method of producing an oil seal comprising:
   slicing an annular seal ring having a predetermined axial thickness from an end of a tubular billet of a resin material;
   providing a substantially annular seal ring support member having an axial end portion;
   placing said seal ring in said support member;
   placing said seal ring and support member in a press;
   fixing said seal ring in said support member by curling the axial end portion of the support member radially inwardly;
   bending the radially inner portion of said seal ring out of the plane of the radially outer portion of said seal ring by driving a mandrel coaxially through said radially inner portion of said seal ring thereby forming a tubular seal lip on said seal ring;
   providing a screw thread cutting-tap on said mandrel; and
   cutting a screw thread on the inner peripheral surface of said tubular seal lip by rotating said tap into said tubular seal lip.

2. A method as claimed in claim 1 wherein:
   said resin material is selected from the group consisting of PTFE FEP, PFA, EPFE, polyetheretherketone and polymeric polyethylene.

3. A method as claimed in claim 2 and further comprising:
   providing a filler in said resin material which improves the wear resistance and the friction characteristic of said resin material.

4. A method as claimed in claim 3, wherein:
   said filler comprises at least one material selected from the group consisting of short glass fibers, short carbon fibers, metal fibers, short ceramics fibers, graphite powder, metal powder, glass powder, ceramics powder, and resin powder.

5. A method as claimed in claim 1 wherein:
   said fixing of said seal ring to said support member is produced by said press.

6. A method as claimed in claim 1 wherein:
   said curling comprises roller curling.

7. A method as claimed in claim 1 wherein said press includes an upper die and a lower die and further comprising:
   providing a dust lip on the radially inner portion of said support member; and
   interposing an annular wall member on the upper die between said dust lip and the mandrel during said tubular seal lip-forming step and said screw thread-cutting step for preventing the mandrel from contacting said dust lip.

8. A method as claimed in claim 1 wherein the press includes an upper die, a lower die, an inner peripheral surface on the lower die and a rounded portion at the upper end of the inner peripheral surface adjacent the upper die, and further comprising:
   placing said seal ring between the upper and lower dies;
   bending said seal ring over said rounded portion during said tubular seal lip-forming step; and
   holding said seal ring on said rounded portion during said screw thread-cutting step.

9. A method as claimed in claim 1 and further comprising:
   placing a sleeve on the mandrel before said tubular seal lip-forming step; and
   driving said sleeve into engagement with said tubular seal lip during further movement of the mandrel after said screw thread-cutting step.

10. A method of producing an oil seal comprising sequentially:
    slicing an annular seal ring having a predetermined axial thickness from an end of a tubular billet of a resin material
    providing a substantially annular seal ring support member having an axial end portion;
    placing said seal ring in said support member;
    placing said seal ring and support member in a press;
    bending the radially inner portion of said seal ring out of the plane of the radially outer portion of said seal ring by driving a mandrel coaxially through said radially inner portion of said seal ring thereby forming a tubular seal lip on said seal ring;
    providing a screw thread cutting-tap on said mandrel;
    cutting a screw thread on the inner peripheral surface of said tubular seal lip by rotating said tap into said tubular seal lip; and
    fixing said seal ring in said support member by curling the axial end portion of the support member radially inwardly.

11. A method of producing an oil seal as claimed in claim 10 wherein:
    said resin material is selected from the group consisting of PTFE, polyetheretherketone and polymeric polyethylene.

12. A method as claimed in claim 11 and further comprising:
    providing a filler in said resin material which improves the wear resistance and the friction characteristic of said resin material.

13. A method as claimed in claim 12 wherein:
    said filler comprises at least one material selected from the group consisting of short glass fibers, short carbon fibers, metal fibers, short ceramics fibers, graphite powder, metal powder, glass powder, ceramics powder, and resin powder.

14. A method as claimed in claim 10 wherein:
said fixing of said seal ring to said support member is produced by said press.

15. A method as claimed in claim 10 wherein:
said curling comprises roller curling.

16. A method as claimed in claim 10 wherein the press includes an upper die, a lower die, an inner peripheral surface on the lower die and a rounded portion at the upper end of the inner peripheral surface adjacent the upper die, and further comprising:
placing said seal ring between the upper and lower dies;
bending said seal ring over said rounded portion during said tubular seal lip-forming step; and
holding said seal ring on said rounded portion during said screw thread-cutting step.

17. A method as claimed in claim 10 and further comprising:
placing a sleeve on the mandrel before said tubular seal lip-forming step; and
driving said sleeve into engagement with said tubular seal lip during further movement of the mandrel after said screw thread-cutting step.

18. A method as claimed in claim 10 wherein said press includes an upper die and a lower die and further comprising:
providing a dust lip on the radially inner portion of said support member; and
interposing an annular wall member on the upper die between said dust lip and the mandrel during said tubular seal lip-forming step and said screw thread-cutting step for preventing the mandrel from contacting said dust lip.

* * * * *